United States Patent
Kim et al.

(10) Patent No.: US 8,790,418 B2
(45) Date of Patent: Jul. 29, 2014

(54) MANUFACTURING METHOD FOR AN ELECTRODE FOR A BATTERY

(75) Inventors: Dae Jun Kim, Chungcheongnam-do (KR); Jae Myeong Lee, Gyeonggi-do (KR); Jeon Keun Oh, Daejeon (KR); Eun Joo Lee, Daejeon (KR)

(73) Assignee: SK Innovation Co., Ltd., Seoul (KR)

( * ) Notice: Subject to any disclaimer, the term of this patent is extended or adjusted under 35 U.S.C. 154(b) by 1058 days.

(21) Appl. No.: 12/520,078

(22) PCT Filed: Dec. 21, 2007

(86) PCT No.: PCT/KR2007/006753
§ 371 (c)(1),
(2), (4) Date: Jun. 18, 2009

(87) PCT Pub. No.: WO2008/078929
PCT Pub. Date: Jul. 3, 2008

(65) Prior Publication Data
US 2010/0024203 A1     Feb. 4, 2010

(30) Foreign Application Priority Data

Dec. 22, 2006 (KR) .................. 10-2006-0132867

(51) Int. Cl.
*H01M 6/00* (2006.01)
*H01M 4/13* (2010.01)

(52) U.S. Cl.
USPC ................ 29/623.1; 29/623.5; 429/209

(58) Field of Classification Search
USPC ................ 29/623.1, 623.5; 429/209
See application file for complete search history.

(56) References Cited

U.S. PATENT DOCUMENTS

| | | | | |
|---|---|---|---|---|
| 5,697,145 A | * | 12/1997 | Fukumura et al. | 29/623.5 |
| 2001/0042288 A1 | * | 11/2001 | Omae et al. | 29/2 |
| 2002/0119367 A1 | | 8/2002 | Watanabe et al. | |
| 2003/0110607 A1 | * | 6/2003 | Bendale et al. | 29/25.03 |

FOREIGN PATENT DOCUMENTS

| | | |
|---|---|---|
| JP | 08-064479 | 3/1996 |
| JP | 9219189 A | 8/1997 |
| JP | 11-185734 | 7/1999 |
| JP | 2003-123732 | 4/2003 |
| JP | 2003-308834 | 10/2003 |
| JP | 2006-131709 | 5/2006 |
| KR | 20030044085 A | 6/2003 |
| KR | 1020060080092 A | 7/2006 |

OTHER PUBLICATIONS

International Search Report of PCT/KR2007/006753, dated Apr. 10, 2008, corresponding to the present application.

* cited by examiner

*Primary Examiner* — Muhammad Siddiquee
(74) *Attorney, Agent, or Firm* — Abelman, Frayne & Schwab

(57) ABSTRACT

This invention relates to a method of manufacturing an electrode for a secondary battery, which enables cost savings and the manufacture of products having various sizes and shapes. The method includes (A) preparing an electrode plate, (B) cutting the electrode plate to conform to the width of the electrode, thus providing a unit electrode plate, and (C) removing at least one of the corner regions of the unit electrode plate.

4 Claims, 5 Drawing Sheets

MANUFACTURING METHOD FOR AN ELECTRODE FOR A BATTERY

CROSS-REFERENCE TO RELATED APPLICATIONS

This application is a 371 of international application number PCT/KR2007/006753, filed on Dec. 21, 2007.

BACKGROUND OF THE INVENTION

1. Field of the Invention

The present invention relates to a method of manufacturing an electrode for a battery, and more particularly, to a method of manufacturing an electrode for a secondary battery, which enables cost savings and the manufacture of products having various sizes and shapes.

2. Description of the Related Art

Generally, a chemical battery refers to a battery composed of a positive electrode, a negative electrode, and an electrolyte to thus generate electrical energy using a chemical reaction, and is classified into a primary battery, which is disposable, and a secondary battery, which is chargeable and dischargeable, thus enabling repeated use. The use of such a secondary battery is gradually increasing due to the advantage of its chargeable and dischargeable characteristic.

Among secondary batteries, a lithium secondary battery has high energy density per unit weight, and thus is widely used as a power source in electronic communication devices and in high-power hybrid vehicles.

The lithium secondary battery includes an electrode group, composed of a positive electrode, a negative electrode, and a separator disposed between the positive and negative electrodes, and a positive electrode tab and a negative electrode tab respectively connected to the positive electrode and the negative electrode. In general, the electrodes such as the positive and negative electrodes are manufactured in such a way that an electrode plate is shaped into a predetermined electrode pattern using a metal die.

When the electrodes are manufactured using a metal die, each of the electrodes defined in the electrode plate must be provided on four sides thereof with tolerances corresponding to more than 10% of the thickness of the electrode plate. In order to ensure providing such a tolerance, a portion of the electrode plate must be disposed of, thus causing the loss of raw material. Consequently, the cost of manufacturing electrodes may be increased and the productivity of electrodes may be greatly reduced.

In this regard, after the electrodes are manufactured using a metal die, debris adhering to the metal die may fall on the electrode plate, and thus micro short-circuits may occur. This may cause the deterioration of reliability of a battery equipped with the electrodes. In order to avoid such defects, the electrode must have an additional resin layer or film and the like disposed thereunder, and thus manufacture of such electrodes is problematic.

In addition, since the metal die has a fixed size and shape, it is possible to manufacture only one type of electrode having fixed size and shape using one metal die. Accordingly, when the size and shape of an electrode must be changed even slightly according to variation in the requirements of customers or market circumstances, all of the equipment for manufacturing the electrode must be replaced.

BRIEF SUMMARY OF THE INVENTION

Accordingly, the present invention has been devised to solve the problems encountered in the related art, and provides a method of manufacturing an electrode for a battery, which minimizes raw material loss, prevents the occurrence of debris, and enables the manufacture of electrodes having various sizes and shapes.

To overcome the above problems, the present invention provides a method of manufacturing an electrode for a battery, including the steps of: (A) preparing an electrode plate; (B) cutting the electrode plate to conform with a width of the electrode, thus providing a unit electrode plate; and (C) removing at least one of the corner regions of the unit electrode plate.

The electrode plate may include a blank region at a side margin thereof, on which no active material is applied.

The step (A) of preparing an electrode plate may include the steps of: (A1) preparing a preliminary electrode plate which includes blank regions at both sides thereof, and (A2) slitting the preliminary electrode plate, thus providing the electrode plate.

The step (A2) of slitting the preliminary electrode plate may be conducted in such a way as to slit the preliminary electrode plate along a center line with respect to a width of the preliminary electrode plate.

The step (B) of cutting the electrode plate may be conducted in a scissor manner.

The step (C) of removing at least one of the corner regions may be conducted using a cutting tool having a planar shape corresponding to a shape of the corner region to be removed in a predetermined pattern.

The unit electrode plate may include a blank region at a side margin thereof, on which no active material is applied, and the step (C) of removing at least one of the corner regions may be conducted in a such a way as to remove first and second corner regions positioned at opposite sides of the blank region.

The step (C) of removing at least one of the corner regions may be conducted in such a way as to remove the first and second corner regions sequentially.

The step (C) of removing at least one of the corner regions may include the steps of: disposing a cutting die over the first corner region; removing the first corner region of the unit electrode plate using the cutting tool; moving the unit electrode plate such that the cutting tool is positioned over the second corner region; and removing the second corner region of the unit electrode plate using the cutting tool.

The step (B) of cutting the electrode plate and the step (C) of removing at least one of the corner regions may be conducted in a continuous process.

The electrode may be adapted to be used in a lithium secondary battery.

In the method of manufacturing an electrode for a battery according to the present invention, since a preliminary electrode plate or an electrode plate is sequentially cut into electrodes, the production cost of the electrodes can be reduced and the reliability of a battery equipped with the manufactured electrodes can be improved.

More specifically, a preliminary electrode plate or an electrode plate is cut such that the cut electrode has a predetermined width and length, and thus the preliminary electrode plate or the electrode plate can be cut without entailing the loss of materials. Consequently, the loss of raw materials is minimized, and thus the production cost can be greatly reduced.

Furthermore, since a preliminary electrode plate or an electrode plate is cut through slitting or shearing, it is possible to prevent the occurrence of debris. Consequently, micro short-circuits are prevented, and thus the reliability of a battery equipped with the manufactured electrode can be improved.

In addition, there is no need to provide additional resin layers or films for preventing the occurrence of debris.

According to the present invention, an electrode plate may be sheared using a cutting tool adapted to operate in a scissors manner, so that the shearing process is conducted in an automated facility. Further, a second step of shearing and a third step of removing the corner regions may be continuously conducted in an automated facility so as to enable the simplification of the process and the improvement of productivity.

In the present invention, since it is possible to easily control a slitting location in a first step or a shearing location in a second step according to the predetermined width and length of an electrode, electrodes having a variety of sizes can be manufactured without restriction. In a third step, the corner regions of the electrode plate are sequentially removed using a cutting tool, and thus a tab junction having a desired size can be positioned at a desired location.

In other words, according to this embodiment, electrodes having various shapes or sizes, which include tab junctions having various positions and sizes, can be manufactured without restriction. Accordingly, when the shape or size of an electrode must be changed, a predetermined electrode can be manufactured by adjusting the cutting position in an existing facility, without imposing the burden of constructing or purchasing a new facility. In this way, the method of manufacturing an electrode for a battery according to the present invention can properly respond to various demands of customers and market changes.

DETAILED DESCRIPTION OF THE INVENTION

Figure 1:
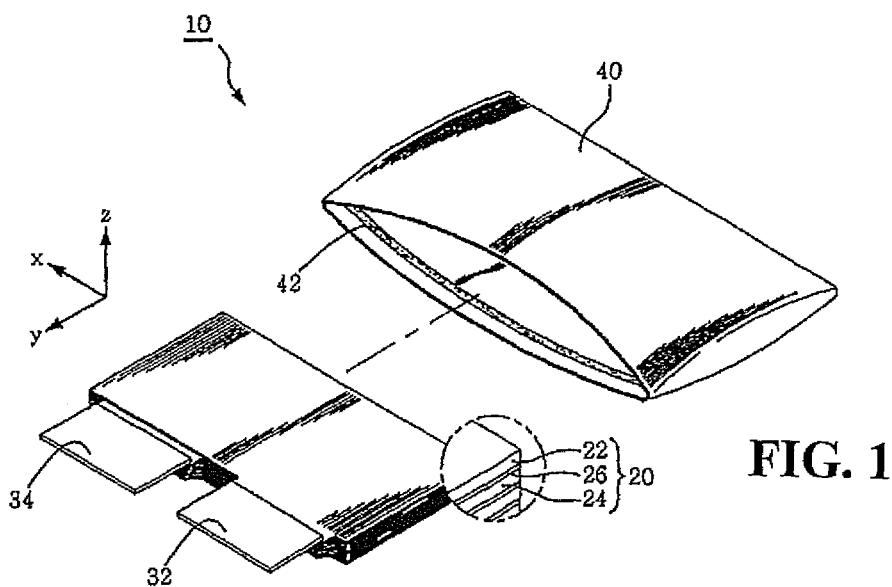
FIG. 1 is a perspective view showing a lithium secondary battery equipped with an electrode manufactured through a method according to an embodiment of the present invention.

The present invention is related to international application number PCT/KR2007/006753, filed on Dec. 21, 2007, which is incorporated herein by reference in its entirety.

As described herein, with reference to FIGS. 1-10, various components are referred to by the following reference numerals.

10 lithium secondary battery
20 electrode group
22 positive electrode
24 negative electrode
26 separator
32 positive electrode tab
34 negative electrode tab
40 case
42 adhesive region
50 electrode
50a current collector
50b active material
50c tab junction
52 preliminary electrode plate
56 electrode plate
58 unit electrode plate
58c first corner region
58c' second corner region
60 slitting tool
62 shearing tool
64 cutting tool
110 preparation step
120 cutting blank plate step
130 cutting corner step
521 blank region
561 blank region
581 blank region.

Hereinafter, a method of manufacturing an electrode for a battery according to an embodiment of the present invention will be described with reference to the appended drawings.

FIG. 1 is a perspective view illustrating a lithium secondary battery equipped with an electrode that is manufactured according to an embodiment of the present invention.

As illustrated in FIG. 1, the lithium secondary battery 10 according to the present invention includes an electrode group 20 including a first electrode 22 (cathode electrode; hereinafter, referred to as a "positive electrode"), a second electrode 24 (anode electrode; hereinafter, referred to as a "negative electrode"), and a separator 26 disposed between the positive electrode and the negative electrode, a first electrode tab 32 (hereinafter, referred to as a "positive electrode tab") and a second electrode tab 34 (hereinafter, referred to as a "negative electrode tab") respectively connected to the positive electrode 22 and the negative electrode 24, and a battery case 40 for accommodating the electrode group 20, the positive electrode tab 32, and the negative electrode tab 34 therein while exposing the ends of the positive electrode tab 32 and the negative electrode tab 34.

Depending on the type of battery, an electrolyte in a liquid state may be injected in the battery case 40, and the separator 26 may play a role as the electrolyte. Alternatively, after an electrolyte in a liquid state is injected in the battery case 40, a polymerizable component may be added thereto, ultimately obtaining the electrolyte in a polymeric state.

In the present embodiment, although the battery case 40 is shown as being comprised of a pouch that is sealed using adhesive regions 42, the present invention is not limited thereto. In particular, a case made of metal or plastic material and having a circular shape or prismatic shape may be used as the battery case 40, which also falls within the scope of the present invention.

The positive electrode 22 and the negative electrode 24, shown in FIG. 1, will now be described in more detail, with reference to FIG. 2. Since the positive electrode 22 and the negative electrode 24 are very similar to or identical to each other as to the basic structure, except for the position of a tab junction 50c (see FIG. 2) and constituents of a current collector and an active material, the positive electrode 22 and the negative electrode 24 will be commonly referred to as an electrode 50 hereinafter.

Figure 2:
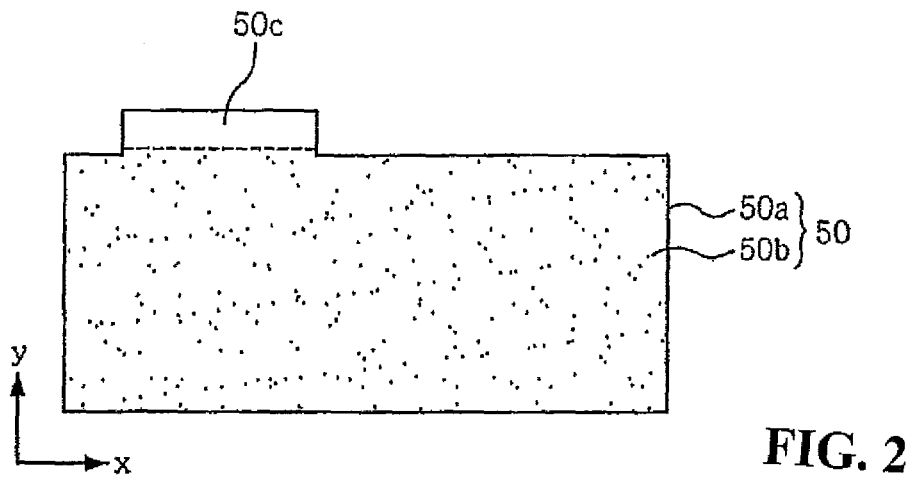
FIG. 2 is a top plan view showing an electrode manufactured through the method according to the embodiment of the present invention.

FIG. 2 is a plan view of the electrode 50 that is manufactured through the method according to an embodiment of the present invention.

Referring to FIG. 2, the electrode 50 according to this embodiment comprises a current collector 50a and an active material 50b applied to at least one side of the current collector 50a.

In this regard, when the electrode 50 is a positive electrode, in an example, the current collector 50a may be made of aluminum while the active material 50b may be made of a lithium-based transition metal oxide. When the electrode 50 is a negative electrode, in an example, the current collector 50a may be made of copper while the active material 50b may be made of carbonaceous material. However, the present invention is not limited thereto, and the current collector 50a and the active material 50b of the electrode 50 may be made of material other than the materials stated above, which also falls within the scope of the present invention.

The electrode 50 is provided with a tab junction 50c that protrudes outward from one side thereof. In alternative embodiments, the tab junction 50c may have various shapes and may be formed at various positions. The tab junction 50c, to which the positive electrode tab 32 (see FIG. 1) or the negative electrode tab 34 (see FIG. 1) is connected, is preferably comprised of a blank part, which does not contain the active material 50b thereon, so that the positive electrode tab 32 or the negative electrode tab 34 is efficiently connected to the electrode 50 through welding.

The method of manufacturing the electrode 50 will now be described in more detail, with reference to FIGS. 3 to 10.

Figure 3:
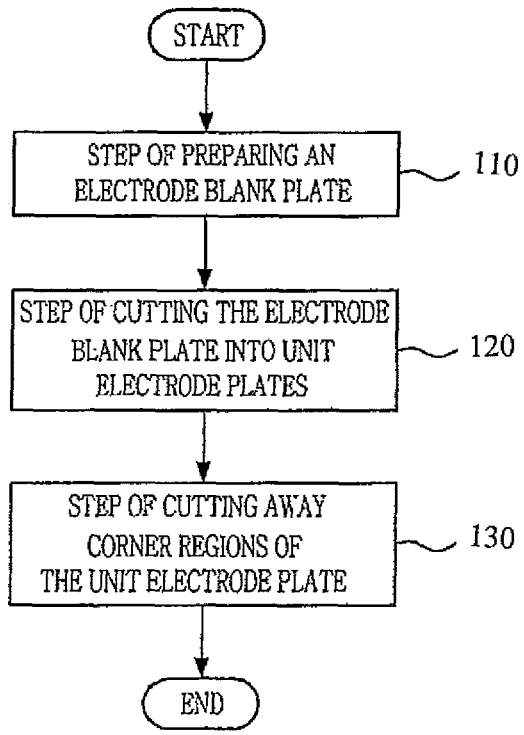
FIG. 3 is a flowchart showing the method of manufacturing an electrode, according to an embodiment of the present invention.

FIG. 3 is a flowchart illustrating the method of manufacturing an electrode according to an embodiment of the present invention.

Referring to FIG. 3, the method of manufacturing an electrode according to this embodiment of the invention comprises a first step 110 of preparing an electrode plate, a second step 120 of cutting the electrode plate into unit electrode plates, and a third step 130 of cutting away corner regions of the unit electrode plate.

Hereinafter, the first step 110, the second step 120, and the third step 130 of the method according to this embodiment will be described in more detail, with reference to FIGS. 4 to 10.

Figure 4:
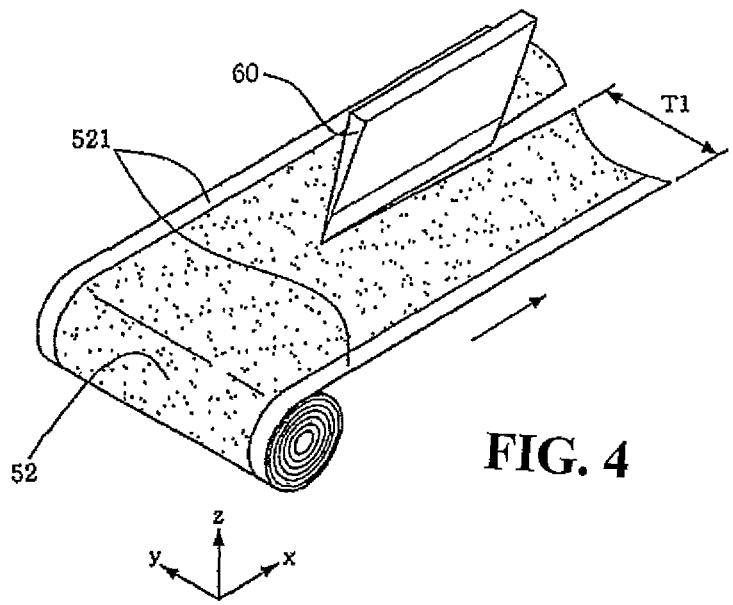
FIG. 4 is a perspective view showing a first step of the method of manufacturing an electrode, according to an embodiment of the present invention.
Figure 5:
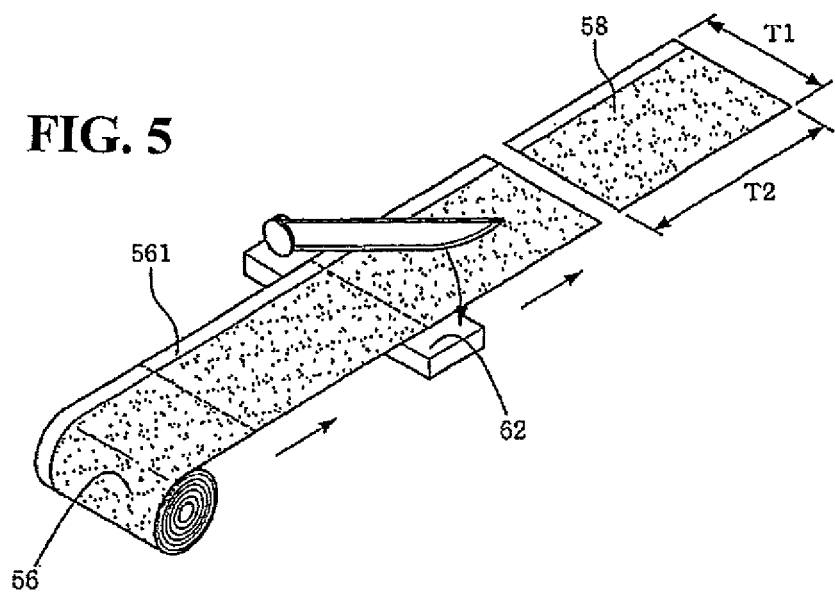
FIG. 5 is a perspective view showing a second step of the method of manufacturing an electrode, according to the embodiment of the present invention.

FIG. 4 is a perspective view showing the first step 110 of the method according to this embodiment of the invention, and FIG. 5 is a perspective view showing the second step 120 of the method according to this embodiment of the invention. Further, FIGS. 6 to 10 are perspective views showing the third step 130 of the method according to this embodiment of the invention.

As shown in FIG. 4, in the first step 110, a preliminary electrode plate 52 is slit so as to prepare an electrode plate 56 (see FIG. 5).

Specifically, a preliminary electrode plate 52, which is provided at both side margin regions with a blank part 521, which is not coated with an active material, is first prepared, and the preliminary electrode plate 52 is slit using a tool such as a slitting blade 60. In this slitting, the preliminary electrode plate 52 is slit such that the resulting electrode 50 (see FIG. 2) has a predetermined width (T1), as shown in FIG. 4.

In an example, the preliminary electrode plate 52 may be prepared such that a current collector 50a (see FIG. 2) having a width twice the predetermined width (T1) of the electrode is coated with the active material 50b (see FIG. 2) except for both side margin regions thereof, that is, both blank regions 521, as shown in FIG. 4, and then the preliminary electrode plate 52 may be slit along the longitudinal center line, which is plotted on the center axis with respect to the lateral direction (the y direction in FIG. 4).

However, the present invention is not limited to the above-described manner, and the preliminary electrode plate 52 may be slit into electrode plates 56 which have widths (T1) that are different from each other, which also falls within the scope of the present invention.

According to this embodiment, since the preliminary electrode plate 52 is slit into the electrode plates 56 to match a predetermined width (T1) of the electrode 50, all of the preliminary electrode plate 52 can be utilized without any discarded material, thus minimizing the waste of material for the preliminary electrode plate 52.

Subsequently, as shown in FIG. 5, in the second step 120, the electrode plate 56, which has blank regions 561 at one side margin region thereof, is cut, or more specifically, sheared into unit electrode plates 58 using a shearing tool 62. In this regard, the electrode plate 56 is sheared to match a predetermined length (T2) of the electrode 50.

In this embodiment, since the electrode plate 56 is sheared to match a predetermined length (T2) of the electrode 50, all of the electrode plate 56 can be used without wasting materials, thus minimizing the waste of material for the electrode plate 56.

The shearing tool 62 may be operated in a manner in which scissors are employed. By performing such a scissor operation, the electrode plate 56 may be cut using the shearing tool 62 at a certain interval while the electrode plate 56 is transferred by the transfer conveyor on which the electrode plate 56 is placed. In this embodiment, the electrode plate 56 is sheared in a scissor manner, so that the electrode plate 56 can be efficiently sheared using automated equipment. However, the present invention is not limited thereto, and the shearing tool may be operated in any manner other than the scissor manner, which also falls within the scope of the present invention.

Subsequently, as shown in FIGS. 6 to 10, in the third step 130, the unit electrode plate 58 is cut using a cutting tool 64, such that both corner regions 58c, 58c' thereof are removed, thus providing a tab junction 50c on the blank region 581.

In this embodiment, both corner regions 58c, 58c', which are positioned at the opposite ends of the blank region 581 formed at a side of the unit electrode plate 58, are removed. However, the present invention is not limited thereto, and the present invention may be applied to any case in which at least one corner of the unit electrode plate 58 is removed.

In FIGS. 6-9, there is shown only the cutting tool 64 for clarity of explanation. The cutting tool 64 may be formed to have a shape corresponding to the corner regions 58c, 58c'. The term "shape corresponding to the corner regions" denotes a shape in which the corner regions 58c, 58c' are cut away according to a previously defined pattern. In this embodiment, the cutting tool 64 has a planar rectangular shape in which the corner regions 58c, 58c' are cut away in rectangular shapes.

The cutting tool 64 may include cutting knifes therein so as to remove the corner regions 58c, 58c'. However, the present invention is not limited thereto, and the cutting tool 64 may be comprised of various configurations, such as a metal die.

Figure 6:
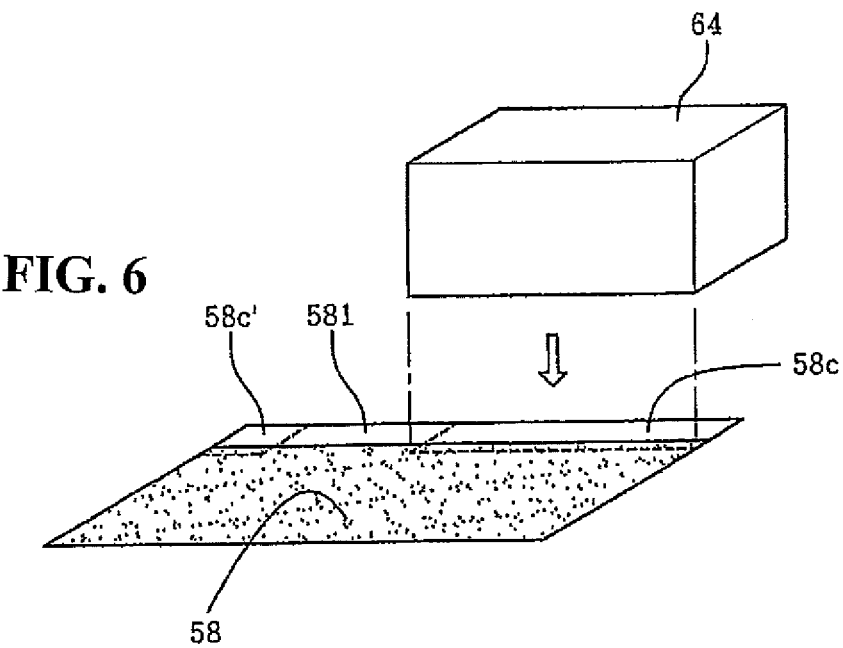
FIGS. 6 to 10 are perspective views showing a third step of the method of manufacturing an electrode, according to the embodiment of the present invention.
Figure 7:
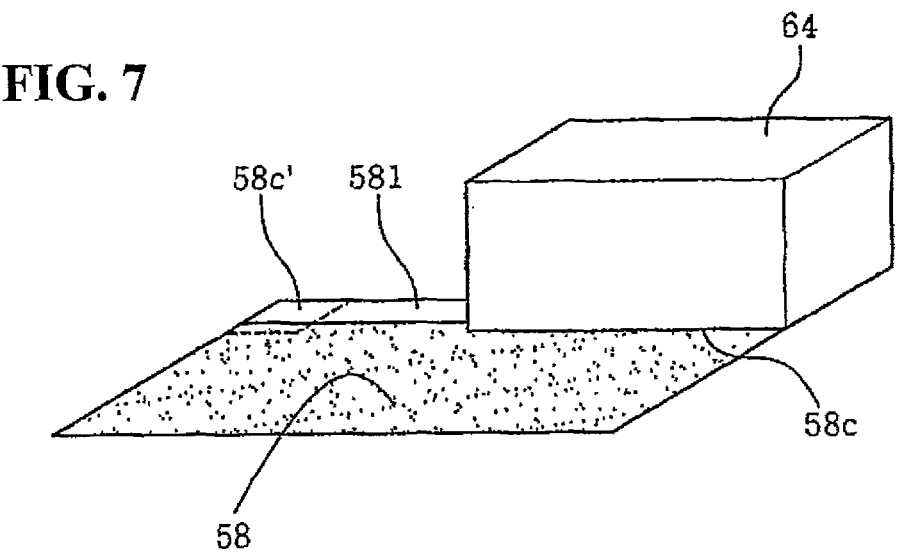
Figure 8:
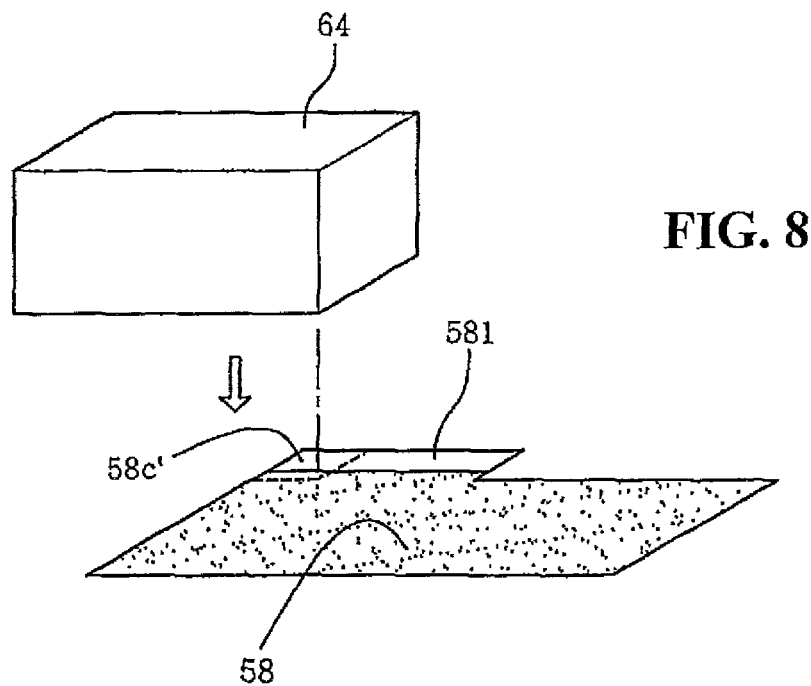
Figure 9:
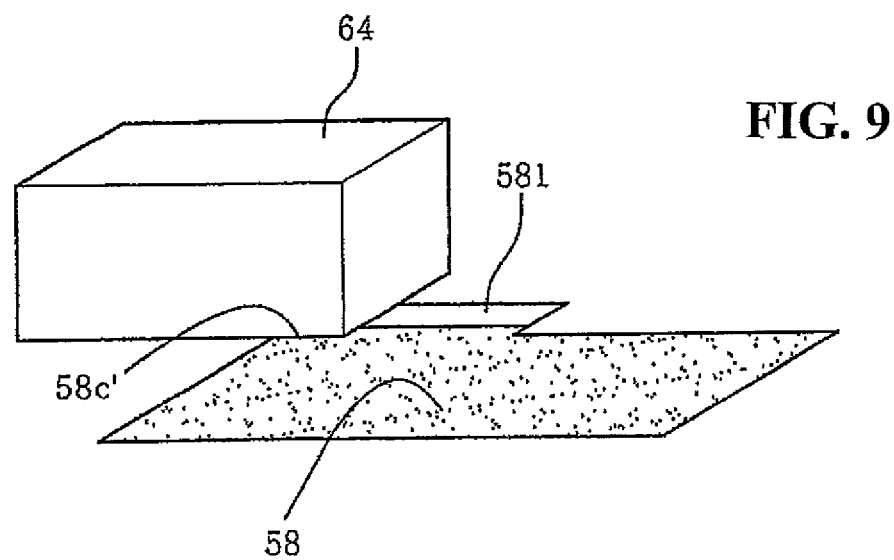
Figure 10:
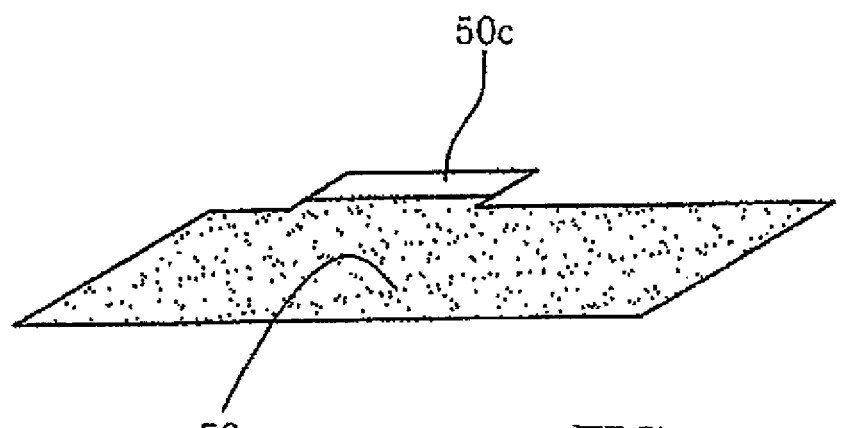

More specifically, as shown again in FIG. 6, the first corner region 58c of the unit electrode plate 58 is first disposed under the cutting tool 64. Subsequently, as shown in FIG. 7, the first corner region 58c is removed using the cutting member 64. Then, as shown in FIG. 8, the unit electrode plate 58 is moved such that the second corner region 58c' is positioned under the cutting tool 64. Thereafter, as shown in FIG. 9, the second corner region 58c' of the unit electrode plate 58 is cut away using the cutting tool 64. Consequently, the manufacture of an electrode 50 including a tab junction 50c is completed, as shown in FIG. 10.

According to this embodiment, the first corner region 58c and the second corner region 58c' are sequentially cut away using only one cutting tool 64, so that the tab junction 50c is created between the cut regions corresponding to the first and second corner regions 58c, 58c'. In other words, in a conventional art, which includes cutting tools 64 designed to remove both first and second corner regions concurrently, the size of the tab junction 50c is fixed. Meanwhile, in this embodiment of the present invention, in which first and second corner regions 58c, 58c' are sequentially removed using only one cutting tool 64, the tab junction may be configured to have a desired position and size according to the relative position between the cutting tool 64 and the unit electrode plate 58.

Alternatively, the second step 120 and the third step 130 in this embodiment as described above may be continuously conducted through an automated facility which is equipped with the shearing tool 62 in the second step 120 and the cutting tool 64 in the third step 130, which are adapted to be sequentially operated. According to this alternative embodiment, the process of manufacturing an electrode may be further simplified, and thus the productivity of the process may be more improved.

As described above, in the method of manufacturing an electrode for a battery according to this embodiment, the first step 110, the second step 120 and the third step 130 are sequentially conducted so as to provide a predetermined electrode 50.

In the first step 110 and the second step 120, the preliminary electrode plate 52 and the electrode plate 56 are cut to match the predetermined width (T1) and length (T2) of the electrode 50, thus enabling the preliminary electrode plate 52 and the electrode plate 56 to be cut without wasting materials. Therefore, it is possible to minimize the waste of the preliminary electrode plate 52 and the electrode plate 56.

Furthermore, since a cutting operation, such as the slitting or the shearing, is conducted in the first step 110 and the second step 120, it is possible to prevent debris that is generated in these steps from falling on the electrode plate, thus preventing micro short-circuits. In addition, there is no need to provide an additional resin layer or film, which otherwise must be used under the electrode.

In addition, according to this embodiment, since the location at which the electrode plate is to be slit or sheared can be controlled without difficulty, in conformity with the predetermined width (T1) and length (T2) of the electrode 50, electrodes 50 having a variety of sizes can be freely manufactured. Further, in the third step 130, since the first corner region 58c and the second corner region 58c' are sequentially removed using the cutting tool 64, it is possible to provide a tab junction 50c having a desired size at a desired location.

In this manner, this embodiment of the present invention is able to manufacture electrodes that can be incorporated in electrodes having a variety of shapes and sizes.

In the embodiment mentioned above, although there has been described a process of manufacturing an electrode of a stacked type electrode, which contains a plurality of positive electrodes and negative electrodes, the present invention is not limited thereto. Accordingly, a winding type battery, in which a positive electrode and a negative electrode are rolled one on the other with a separator disposed therebetween and the positive and negative electrodes have respective protruding tab junctions, can also be manufactured according to the present invention, which also falls within the scope of the invention.

Furthermore, although the electrode manufactured according to the embodiment has been described as being used in a lithium secondary battery, the present invention is not limited thereto, but can be applied to a process of manufacturing a variety of types of electrodes for batteries, which also falls within the scope of the present invention.

Although the preferred embodiment of the present invention has been disclosed for illustrative purposes, the present invention is not limited thereto, and those skilled in the art will appreciate that various modifications, additions and substitutions are possible within the technical spirit and scope of the invention, which is defined by the detailed description and the accompanying drawings.

What is claimed is:

1. A method of manufacturing an electrode for a battery, comprising steps of:
   (A) preparing an initial electrode plate comprising the steps of:
      (A1) preparing a preliminary electrode plate which includes an axis and blank regions, at opposite sides of said axis, on which no active material is applied, and
      (A2) slitting the preliminary electrode plate in an axial direction, thus producing the initial electrode plate having a blank region on one side thereof;
   (B) cutting the initial electrode plate in a scissors manner to conform with a width of the electrode, thus providing a unit electrode plate in which the blank region has corner regions; and
   (C) removing first and second corner regions on the unit electrode plate positioned at opposite sides of the blank region, on which no active material is applied;
   wherein the step (C) of removing the first and the second corner regions is conducted in such a way as to remove the first and the second corner regions sequentially, wherein the step (B) of cutting the initial electrode plate and the step (C) of removing the first and the second corner regions are conducted in a continuous process;
   wherein the step (C) of removing the first and second corner regions comprises the steps of:
   positioning a cutting tool and said unit electrode plate relative to one another so that said cutting tool is positioned over said first corner region;
   removing the first corner region of the unit electrode plate using said cutting tool;
   repositioning said unit electrode plate or said cutting tool so that said cutting tool is positioned over the second corner region; and
   removing the second corner region of the unit electrode plate using said cutting tool.

2. The method according to claim 1, wherein the step (A2) of slitting the preliminary electrode plate is conducted in such a way as to slit the preliminary electrode plate along a center line with respect to a width of the preliminary electrode plate.

3. The method according to claim 1, wherein the step (C) of removing the first and the second corner regions of the unit electrode plate is conducted using a cutting tool having a shape corresponding to a shape of the corner region to be removed in a predetermined pattern.

4. The method according to claim 1, wherein the battery is a lithium secondary battery and the electrode is adapted to be used in the lithium secondary battery.

* * * * *